(12) United States Patent
Hassler et al.

(10) Patent No.: US 9,995,355 B2
(45) Date of Patent: Jun. 12, 2018

(54) CONE BRAKE FRICTION SURFACE COATING

(71) Applicant: Rolls-Royce Corporation, Indianapolis, IN (US)

(72) Inventors: Kyle A. Hassler, Pittsboro, IN (US); Sean Warrenburg, Avon, IN (US); Joseph A. Swift, Indianapolis, IN (US); Kevin Mock, Martinsville, IN (US); Mark Winely, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 170 days.

(21) Appl. No.: 14/991,725

(22) Filed: Jan. 8, 2016

(65) Prior Publication Data

US 2016/0201748 A1 Jul. 14, 2016

Related U.S. Application Data

(60) Provisional application No. 62/102,686, filed on Jan. 13, 2015.

(51) Int. Cl.
| | | |
|---|---|---|
| *B64D 35/00* | (2006.01) | |
| *F16D 69/02* | (2006.01) | |
| *B64C 11/00* | (2006.01) | |
| *F16D 49/00* | (2006.01) | |
| *F16D 25/0632* | (2006.01) | |
| *F16D 55/28* | (2006.01) | |
| *F16D 55/00* | (2006.01) | |

(Continued)

(52) U.S. Cl.
CPC ............ *F16D 69/027* (2013.01); *B64C 11/00* (2013.01); *F16D 25/0632* (2013.01); *F16D 49/00* (2013.01); *F16D 55/28* (2013.01); *F16D 2055/0058* (2013.01); *F16D 2065/024* (2013.01); *F16D 2069/003* (2013.01); *F16D 2200/0026* (2013.01); *F16D 2250/0046* (2013.01)

(58) Field of Classification Search
None
See application file for complete search history.

(56) References Cited

U.S. PATENT DOCUMENTS 2,951,540 A * 9/1960 Hawkins ................ B64D 35/00
188/187
4,376,614 A * 3/1983 Woodruff ............. B64C 11/385
188/71.1

(Continued)

FOREIGN PATENT DOCUMENTS

| DE | 10035489 A1 | 1/2002 |
|---|---|---|
| DE | 102008062132 A1 | 6/2010 |
| WO | WO-2014097186 A1 | 6/2014 |

OTHER PUBLICATIONS

European Search Report dated Jun. 13, 2016 issued in EP Patent Application No. 16150754.6.

*Primary Examiner* — Richard G Davis
(74) *Attorney, Agent, or Firm* — Fishman Stewart PLLC

(57) ABSTRACT

An exemplary cone brake device includes a brake drum and a thermal sprayed coating deposited and bonded to the outer surface. The thermal sprayed coating is configured to engage a friction lining when one of the brake drum and the friction element is moved toward the other of the brake drum and the friction element, so as to decrease the speed of an aerospace propeller.

17 Claims, 2 Drawing Sheets

(51) Int. Cl.
*F16D 65/02* (2006.01)
*F16D 69/00* (2006.01)

(56) References Cited

U.S. PATENT DOCUMENTS

| | | | |
|---|---|---|---|
| 4,567,965 A * | 2/1986 | Woodruff | B64C 11/385 |
| | | | 188/170 |
| 4,715,486 A | 12/1987 | Burgdorf et al. | |
| 4,778,730 A | 10/1988 | Zucker | |
| 5,203,434 A * | 4/1993 | Teeter | F16D 55/30 |
| | | | 188/70 R |
| 5,249,661 A | 10/1993 | Kawamura et al. | |
| 5,407,048 A * | 4/1995 | Sievers | C23C 4/00 |
| | | | 192/107 M |
| 5,612,110 A | 3/1997 | Watremez | |
| 5,629,101 A | 5/1997 | Watremez | |
| 5,878,849 A | 3/1999 | Prunier, Jr. et al. | |
| 5,957,251 A | 9/1999 | Jones et al. | |
| 5,964,320 A | 10/1999 | Kato et al. | |
| 5,964,322 A | 10/1999 | Thompson et al. | |
| 6,119,824 A * | 9/2000 | McCallum | F16D 55/30 |
| | | | 188/72.7 |
| 6,129,306 A * | 10/2000 | Pham | B60F 5/02 |
| | | | 244/2 |
| 6,761,256 B2 | 7/2004 | Falk | |
| 7,442,443 B2 * | 10/2008 | Swank | C22C 38/02 |
| | | | 188/251 A |
| 8,261,891 B2 | 9/2012 | Thebault et al. | |
| 8,469,161 B2 | 6/2013 | Abe et al. | |
| 2003/0024778 A1 * | 2/2003 | Baldwin | F16D 51/00 |
| | | | 188/78 |
| 2006/0272909 A1 | 12/2006 | Fuller et al. | |
| 2006/0283672 A1 * | 12/2006 | Tsurubuchi | F16D 69/02 |
| | | | 188/251 A |
| 2009/0101452 A1 * | 4/2009 | Zimmer | F16D 53/00 |
| | | | 188/71.1 |
| 2015/0233467 A1 * | 8/2015 | Noerenberg | F16H 57/10 |
| | | | 192/221.1 |
| 2016/0159626 A1 * | 6/2016 | Hartmann | B66D 1/12 |
| | | | 254/344 |

\* cited by examiner

CONE BRAKE FRICTION SURFACE COATING

CROSS-REFERENCE TO RELATED APPLICATIONS

This application claims priority to U.S. Provisional Patent Application No. 62/102,686 filed on Jan. 13, 2015, the contents of which are hereby incorporated by reference in its entirety.

GOVERNMENT RIGHTS

This disclosure was made with government support under Contract Number F34601-03D-0006 awarded by the Department of the Air Force. The government has certain rights in the disclosure.

FIELD OF TECHNOLOGY

The present disclosure relates to gearboxes for aircraft propeller systems and more particularly, but not exclusively, to a gear box having a cone brake device that has a thermal sprayed coating, which has greater hardness so as to increase the service life of the brake device.

BACKGROUND

Turboprop manufacturers produce cone brake devices that are configured to slow down the rotation of a propeller during and after engine shutdown. In particular, the typical cone brake device can have an outer surface that is urged into direct contact with an element connected to the propeller. Over the service life of the turboprop, the outer surface can become worn, thus adversely affecting the coefficient of friction at the interface between the outer surface and the component. For this reason, the propeller may freely "windmill" during and after engine shutdown.

It would therefore be helpful to provide a cone brake device that is configured to slow down rotation of a propeller over a longer service life of the turboprop, thus reducing maintenance of the turboprop and improving overall performance of the same.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary cone brake device ("brake device") is described herein and shown in the attached drawings. The exemplary brake device is a component of a gear box that is configured to operate a propeller for an aerospace propeller system. The exemplary aerospace propeller system can be a single shaft, modular design military turboprop with a 14 stage axial flow compressor driven by a four stage turbine. However, the cone brake device can instead be a component of other suitable gear boxes for various propulsion or drive mechanisms corresponding with any vehicle. In this example, the cone brake device includes a brake drum and a thermal sprayed coating deposited and bonded to the outer surface of the brake drum. The thermal sprayed coating is configured to engage a friction lining when one of the brake drum and the friction lining is moved toward the other of the brake drum and the friction element, so as to decrease the speed of an aerospace propeller. One exemplary benefit of the thermal sprayed coating is that it maintains its surface roughness and increases the service life of the brake device, thus increasing its overall performance.

Figure 1:
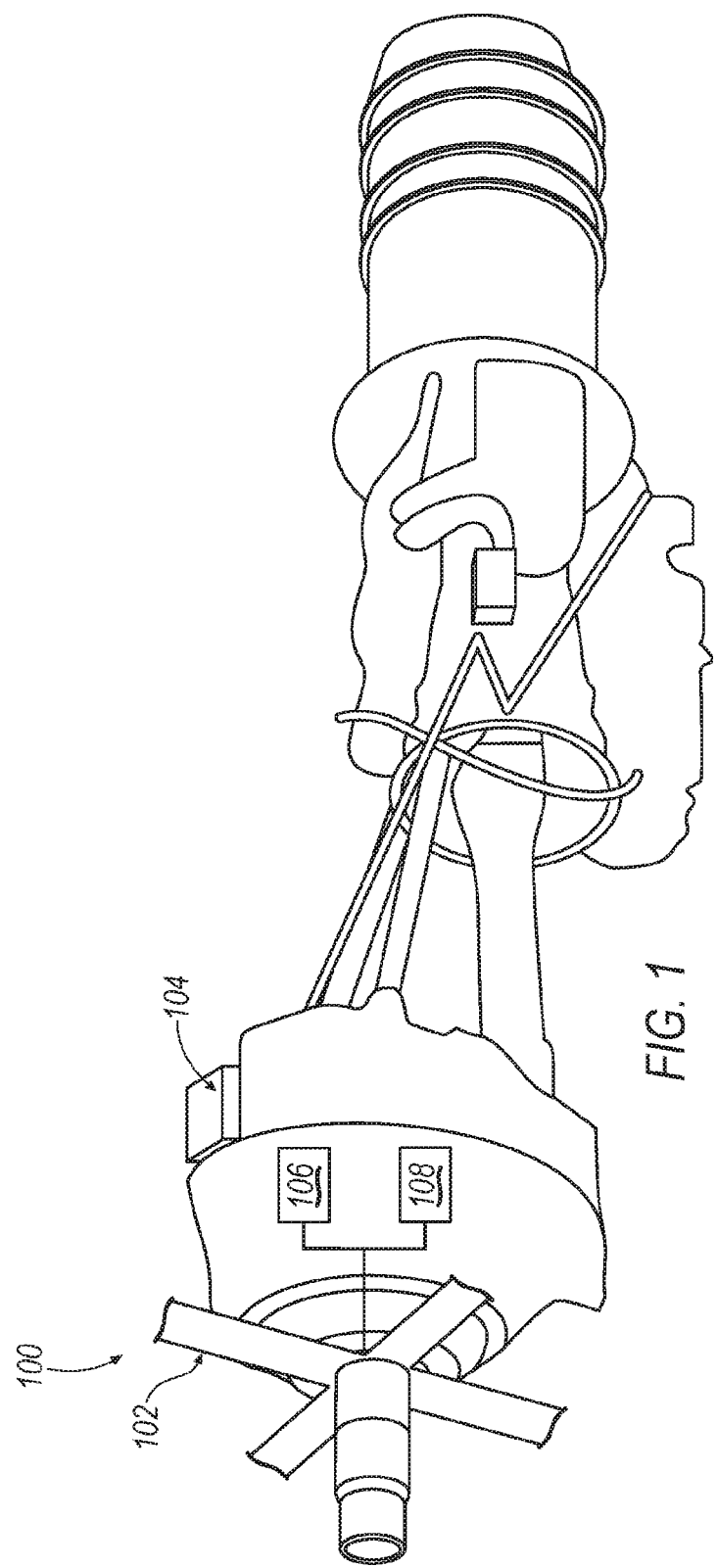
FIG. 1 schematically illustrates some aspects of one non-limiting example of an aircraft propeller system including a gear box that has a cone brake device, in accordance with one non-limiting exemplary embodiment of the present disclosure.

Referring to FIG. 1, there is illustrated one non-limiting example of an aircraft propeller system 100 having an aerospace propeller 102 and a gear box 104, which includes a gear set 106 that is connected to the propeller 102 and configured to rotate the same. The gear box 104 further includes a cone brake device 108, which in this example, is configured to decrease the speed of the propeller 102.

Figures 2, 3:
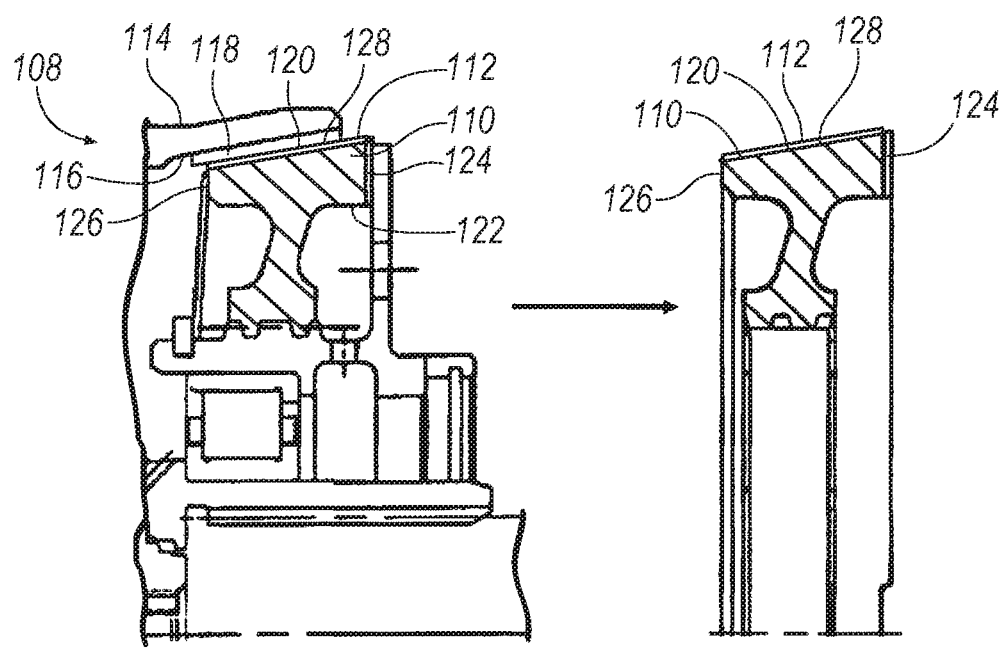
FIG. 2 is a cross-sectional view of one portion of the cone brake device of FIG. 1, having a conical drum and a thermal sprayed coating.
FIG. 3 is an enlarged view of the conical drum of FIG. 2.

FIG. 2 illustrates a cross sectional view of a portion of the cone brake device 108 ("brake device"), having a brake drum 110, and FIG. 3 is a cross-sectional view of a portion of the brake drum 110, illustrating that the brake device 108 has a thermal spray coating 112. The thermal spray coating 112 can have a thickness in the range between 20 micrometers to several millimeters. Thus, the coating 112 is schematically represented by a line in FIG. 3, which is not drawn to scale. Of course, the coating can instead have any thickness above or below this range.

More specifically, as shown in FIG. 2, the exemplary brake device 108 includes an outer member 114, which has an annular inner surface 116. The brake device 108 also includes a friction element 118, pad or lining, which is attached to the annular inner surface 116. The friction element 118 can be riveted to the outer member 114. However, the friction element 118 can be attached to the outer member 114 by other suitable fasteners and attachment methods. Furthermore, the brake drum 110 also has an outer surface 120, and in particular, the brake drum 110 can be a ring 122 having a first end 124 and a second end 126, and the ring can have an outside diameter that tapers from the first end 124 to the second end 126, such that the outer surface 120 of the brake drum 110 is a frustoconical surface 128. The thermal sprayed coating 112 is attached to the outer surface 120 of the brake drum 110, and the thermal sprayed coating 112 is configured to engage the friction element 118 when the friction element 118 is moved toward the brake drum 110 so as to contact the same, thus decreasing a speed of the propeller 102. Of course, another example of the brake device can be configured to move the brake drum toward the friction element so as to decrease propeller speed. One example of the coating 112 is a High Velocity Oxygen Fuel (HVOF) coating made of Tungsten Carbide—17% Cobalt hard material. The HVOF coating is applied by a thermal spray coating process in which molten or semi-molten materials are sprayed onto the outer surface 120 by means of the high temperature, high velocity gas stream. In particular, this process produces a dense spray coating that can be ground to a very high surface finish. The HVOF coating 112 has an increased density and hardness, thus increasing resistance to erosion, wear, and corrosion, and maintaining the roughness of the coating 112 over a longer service life of the brake device 108. In other examples, other processes can be utilized for applying the coating to the outer surface.

The friction element 118 can be made of sintered bronze material. Sintering is the process of compacting and forming a solid mass of material by heat and/or pressure without melting it to the point of liquefaction. Sintering happens when the atoms in the materials diffuse across the boundaries of the particles, fusing the particles together and creating one solid piece. One exemplary advantage of the sintering process is that it can utilize heat below the melting point of the material, thus reducing manufacturing costs corresponding with materials having considerably high melting points, such as tungsten. The sintered material has multiple distinctive structural characteristics. As one example, the sintered material can preserve its purity at least because of the fewer steps in the fabrication process. Furthermore, in the sintering process, there is an absence of binding contact between segregated powder particles or "inclusions," as can often occur in melting processes.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. A cone brake device, comprising:
    an outer member having an annular inner surface;
    a friction element attached to the annular inner surface of the outer member;
    a brake drum having an outer surface and configured to move toward the friction element; and
    a thermal sprayed high velocity oxygen fuel coating including molten or semi-molten material attached to the outer surface of the brake drum and having a thickness greater than 1.5 mm, and the thermal sprayed coating is configured to engage the friction element when one of the brake drum and the friction element is moved toward the other of the brake drum and the friction element.
2. The cone brake device of claim 1, wherein the thermal sprayed coating is a tungsten carbide—17% cobalt hard material.
3. The cone brake device of claim 1, wherein the friction element is a sintered bronze material.
4. The cone brake device of claim 1, wherein the outer surface is a frustoconical surface.
5. The cone brake device of claim 1, wherein the brake drum is a ring having a first end and a second end, and the ring has an outside diameter that tapers from the first end to the second end.
6. The cone brake device of claim 1, wherein one of the outer member and the brake drum is connected to an aerospace propeller.
7. A gear box, comprising:
    a gear set; and
    a cone brake device including an outer member, a friction element, a brake drum and a thermal sprayed high velocity oxygen fuel coating including molten or semi-molten material and having a thickness greater than 1.5 mm;
    wherein the outer member has an annular inner surface;
    wherein the friction element is attached to the annular inner surface of the outer member;
    wherein the brake drum has an outer surface and is configured to move toward the friction element; and
    wherein the thermal sprayed high velocity oxygen fuel coating is attached to the outer surface of the brake drum, and the thermal sprayed coating is configured to engage the friction element when one of the brake drum and the friction element is moved toward the other of the brake drum and the friction element.
8. The gear box of claim 7, wherein the thermal sprayed coating is a tungsten carbide—17% cobalt hard material.
9. The gear box of claim 7, wherein the friction element is a sintered bronze material.
10. The gear box of claim 7, wherein the outer surface is a frustoconical surface.
11. The gear box of claim 7, wherein the brake drum is a ring having a first end and a second end, and the ring has an outside diameter that tapers from the first end to the second end.
12. The gear box of claim 7, wherein one of the outer member and the brake drum is connected to an aerospace propeller.
13. An aircraft propeller system, comprising:
    an aerospace propeller; and
    a gear box including a gear set and a cone brake device;
    wherein the gear set is configured to rotate the aerospace propeller;
    wherein the cone brake device includes an outer member, a friction element, a brake drum and a thermal sprayed high velocity oxygen fuel coating including molten or semi-molten material and having a thickness greater than 1.5 mm;
    wherein the outer member has an annular inner surface;
    wherein the friction element is attached to the annular inner surface of the outer member;
    wherein the brake drum has an outer surface and is configured to move toward the friction element; and
    wherein the thermal sprayed high velocity oxygen fuel coating is attached to the outer surface of the brake drum, and the thermal sprayed coating is configured to engage the friction element when one of the brake drum and the friction element is moved toward the other of the brake drum and the friction element, so as to decrease a speed of the aerospace propeller.
14. The aircraft propeller system of claim 13, wherein the thermal sprayed coating is a tungsten carbide—17% cobalt hard material.
15. The aircraft propeller system of claim 13, wherein the friction element is a sintered bronze material.
16. The aircraft propeller system of claim 13, wherein the outer surface is a frustoconical surface.

17. The aircraft propeller system of claim 13, wherein the brake drum is a ring having a first end and a second end, and the ring has an outside diameter that tapers from the first end to the second end.

* * * * *